April 26, 1960  C. C. LAVAL, JR  2,934,146
CUTTING TOOL
Filed July 10, 1956

CLAUDE C. LAVAL, JR.
INVENTOR.

HUEBNER, BEEHLER,
WORREL & HERZIG
ATTORNEYS

BY Richard M. Worrel

United States Patent Office 2,934,146
Patented Apr. 26, 1960

2,934,146
CUTTING TOOL

Claude C. Laval, Jr., Fresno, Calif.

Application July 10, 1956, Serial No. 596,861

9 Claims. (Cl. 166—55)

The present invention relates to cutting tools and more particularly to a tool for cutting pipes, casings and other workpieces having bores or openings therein suited to the reception of the tool. While the tool is primarily intended for cutting purposes, it is excellently suited to the etching or other chemical modification of workpieces received thereby.

The invention constitutes a solution to certain long recognized problems encountered in wells and other bore holes and is suitably illustrated by reference to such operational environments. It frequently becomes desirable to retrieve pipes, tubes, casings and the like from wells. Unfortunately such members are often tightly jammed or snagged so as to make their extraction difficult or impossible by simple pulling action. Conventionally it is the usual practice in such instances to lower explosives into the wells adjacent to the members to be extracted and to actuate the explosive in proximity to the members in the hope they will be severed. When this results in a severing action without re-snagging, a segment of the workpiece is freed for removal. However, the uncontrolled nature of such explosions frequently destroys the wells and seriously damages even the retrievable segments of the members.

Obviously, a precisely controllable device for severing pipes, casings and the like in such relatively inaccessible locations has long been needed. Numerous mechanical cutters have been devised for the purpose but insofar as is known, they have fallen short of achieving desired results. Characteristically, these known mechanical devices have been relatively complex, heavy and cumbersome to handle, expensive and time consuming to operate, and have performed their cutting action with varied results. At any rate, in spite of much work having been done with mechanical cutters, the explosive severance described still constitutes the general practice.

While the subject invention is primarily intended for performing tasks similar to those described above in well operations, it will be understood that the tool has a much wider application. For example it may be utilized for releasing chemicals internally of objects into which the tool is inserted for other surface treating purposes than the etching, cutting or similar material removing actions described.

Accordingly, it is an object of the present invention to provide a remotely operable tool for releasing chemicals internally of objects into which the tool is inserted.

Another object is to provide such a tool in which the area of chemical activity can be precisely delineated.

Another object is to provide a chemical cutting tool for cutting objects into which the tool is receivable, such as pipes, conduits, well casings, boreholes, and the like.

Another object is to enable the salvage of jammed or snagged well casings, pipes, tubes, conduits and other workpieces having openings for the reception of a tool therein by a carefully controllable and non-violent operation.

Another object is to provide a cutting tool which is remotely controllable for use in boreholes.

Another object is to provide a tool for cutting predetermined sections of well casings and the like by chemical means without significant damage to the tool itself or to adjacent portions of the casing.

Another object is to provide a cutting tool for tubular workpieces which accommodates the release of hydrogen or other gas incident to the action of a chemical cutting agent on such a workpiece.

Another object is to provide a cutting tool of the character described which is relatively simple in construction, easy to assemble and use, light in weight, and dependable in operation.

These and other objects will become more fully apparent upon reference to the following description and accompanying drawing.

Figure 1:
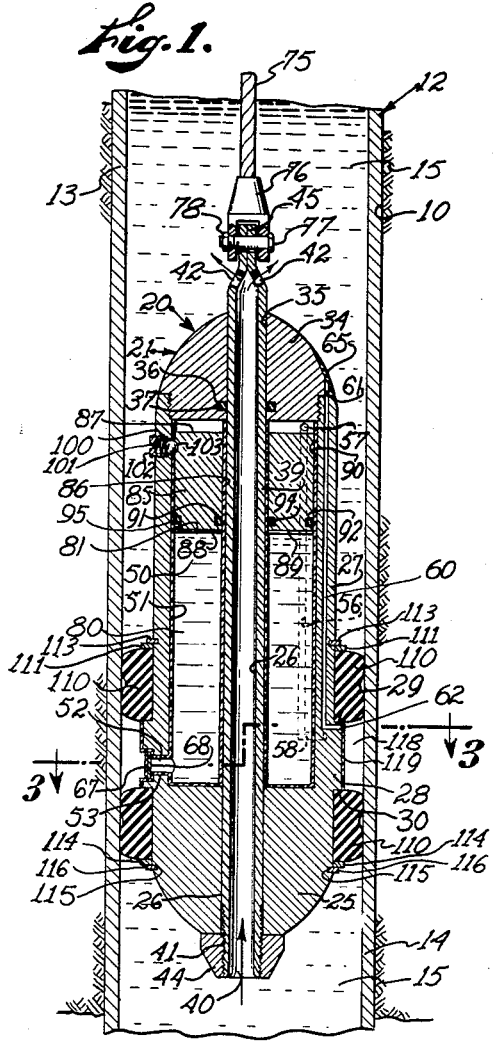
Fig. 1 is an axial section of a borehole, such as a well, having a tubular casing therein showing a tool constructed in accordance with the principles of the present invention suspended in the casing.
Figure 2:
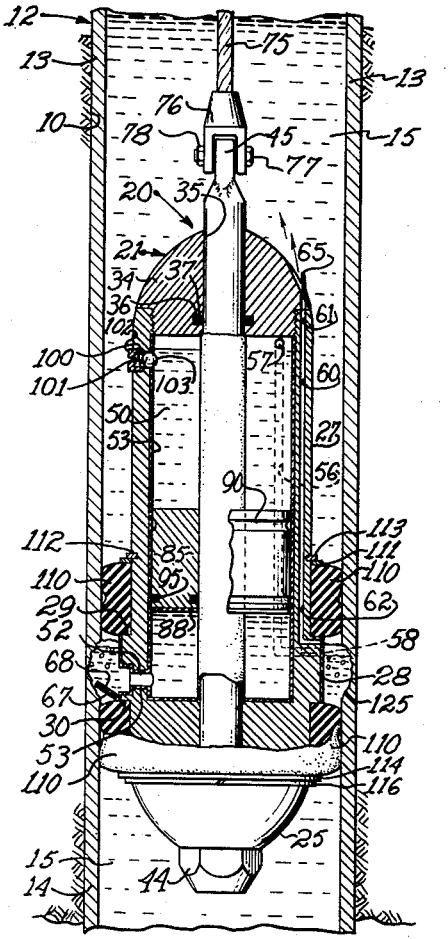
Fig. 2 is a view similar to Fig. 1 but showing the tool in operation to etch or cut the casing.
Figure 3:
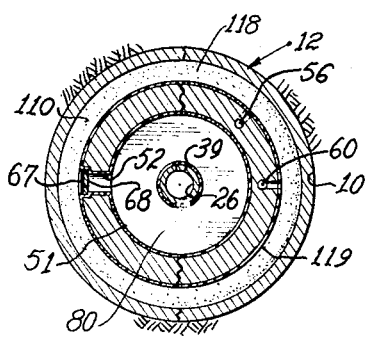
Fig. 3 is a horizontal section taken on a plane at a position represented by line 3—3 of Fig. 1.

Referring more particularly to the drawing, a borehole or well is indicated by the numeral 10 in Figs. 1 and 2. An elongated substantially cylindrical metal casing 12 is located in the well and provides an upper section 13 and a lower section 14. The casing is illustrated as containing oil, water, or other well fluid 15.

The cutting tool of the present invention is referred to in its entirety by the number 20 and includes an elongated housing 21 of steel or other suitable material having a lower end or base 25 providing a concentric bore 26 therethrough. An elongated substantially cylindrical outer wall 27 is integrally upwardly extended from the base, and an annular collar 28 formed around the wall defines an upper shoulder 29 and a lower shoulder 30.

The housing 21 also provides an upper cap 34 screw-threadably received in the upper end of the outer wall 27 and providing a concentric bore 35 in axial alignment with the bore 26. The cap has an annular recess 36 circumscribing the bore, and an O-ring 37 is located in the recess.

The housing further includes an elongated hollow tubular member 39 which is axially extended through the bores 26 and 35, and has a lower opening 40, a lower threaded end 41, and a pair of upper openings 42. The tubular member thus circumscribes a concentric bore extended through the housing. It will be evident that the O-ring 37 provides a seal slidably fitted around the tubular member. A nut 44 is screw-threadably fitted on the threaded end of the tubular member, and the latter provides an upwardly extended lug 45 for a purpose to be described hereinafter.

The housing 21 thus provides an internal annular chamber or reservoir 50 having upper and lower portions between the tubular member 39 and the outer wall 27. A lining 51 covers the tubular member and the inner surface of the outer wall. The housing provides an outlet port 52 substantially radially extended from the lower portion of the chamber through the outer wall to the exterior of the housing. It is to be noted that the outlet port is above the lower shoulder 30. Although the outlet port is shown directly radially extended out of the housing, it could extend longitudinally upwardly or downwardly through the wall and open outwardly of the housing adjacent to the upper end of the housing or below the illustrated location of the port. An annular lining 53 also circumscribes the outlet port and is preferably continuous with the lining 51 in the chamber.

Still further, the housing 21 has an elongated inlet passageway 56 providing an upper end 57 opening into the upper portion of the chamber 50, extended longitudinally through the outer wall 27, and a lower end 58 opening from the outer wall to the outside of the housing at a position slightly above but substantially diametrically opposite to the position at which the outlet port 52 opens to the outside of the housing. Thus, the outlet port is near the lower shoulder 30 whereas the inlet passageway is near the upper shoulder 29 on the opposite side of the housing. The housing also has an elongated gas release bore 60 having an upper end 61 opening outwardly of the housing at the upper end 22 thereof, extended longitudinally through the outer wall 27, and a lower end 62 opening outwardly of the housing at a position adjacent to the lower end of the inlet passageway.

A flapper valve 65 is secured to the cap 34 and normally overlies the upper end 61 of the gas release bore 60 for closing this bore. The flapper valve is adapted to open incident to a predetermined pressure in the bore 60 applied outwardly thereagainst. The closed position of the valve is shown in Fig. 1 and the open position is shown in Fig. 2.

Further, a plug 67 is preferably fitted in the outlet port 52 having an internal lining 68 disposed inwardly of the housing 21. The plug is adapted to be released so as to open the outlet port upon the development of a predetermined pressure in the chamber 50 so as to blow the plug out of its position in the outlet port. The plug is shown in position in the port in Fig. 1, and is shown released from the port in Fig. 2.

An elongated cable 75, partially shown in Figs. 1 and 2, has a clevis 76 secured thereto and releasably connected to the lug 45 by means of a bolt 77 extended through the clevis and the lug. A nut 78 is screw-threadably fitted on the bolt. The cable is employed for elevationally raising and lowering the tool 20 in the well casing 12 or other borehole.

A fluid chemical agent 80 is provided in the chamber 50 which is adapted to disintegrate or cut through the metallic material of the well casing 12. The chemical agent has an upper surface or level 81 below the upper extremity of the chamber. The agent may conveniently take the form of an acid such as hydrochloric acid (HCl); sulphuric acid ($H_2SO_4$); hydrofluoric acid (HF); and the like, or a base, such as lye. In some uses of the tool 20, the plug 67 is not regarded as essential and this would be particularly true where the outlet port 52 opens at position above the level of the chemical agent.

An annular piston 85 provides a concentric bore 86 slidably fitted to the tubular member 39 around the lining 51 for longitudinal sliding movement in the chamber 50. The piston has an upper surface 87, a lower surface 88 covered with lining 89, an upper annular locking groove 90, and inner and outer annular recesses 91 and 92, respectively. Inner and outer O-rings 94 and 95 are placed in the inner and outer recesses, respectively, for providing fluid seals between the piston and the tubular member, and between the piston and the wall 27 of the housing 21.

The outer wall 27 of the housing 21 has a substantially radial pocket 100 in which is positioned a spring 101. An adjusting head 102 is screw-threadably fitted in the pocket from the outside of the housing, and a detent ball 103 is interposed the spring and the piston 85. When the piston is in an upper position, as in Fig. 1, the ball detent engages the locking groove 90 to hold the piston in such position. However, the detent ball is adapted automatically to release the piston for gravitational descent in the chamber, as seen in Fig. 2, and as described hereinafter.

Upper and lower annular packers or fluid barriers 110 are mounted in circumscribing relation on the outer wall 27 of the housing 21 and in longitudinally spaced relation above and below the collar 28. These packers are of material resistant to the chemical agent 80, as will be evident. An upper retainer ring 111 is fitted in an annular channel 112 in the outer wall, and a snap ring 113 is fitted between the retaining ring and the upper packer for securing the packer in position against the upper shoulder 29. In like manner, a lower retainer ring 114 is mounted in an annular channel 115, and a snap ring 116 holds the lower packer against the lower shoulder 30. In this manner the packers are adapted to engage, in fluid-tight relation, the well casing 12 so as to define an annular fluid-tight space 118 between the casing and the collar of the housing. A lining 119 circumscribes the collar. It is to be understood in passing that the packers may be of solid deformable type, as illustrated; one of the inflatable type such as that shown at 18 and 19 in my co-pending United States patent application, Serial No. 395,437; now Patent 2,812,697; or of any of the conventional and well-known types suitable for the purpose. It will be evident that the packers may be constructed to seal off radial segments only instead of a complete annular space, if desired.

*Operation*

The operation of the described embodiment of the present invention is believed readily apparent and is briefly summarized at this point. With the tool above the surface 11 of the borehole 10, the cap 34 is unthreaded, and the piston 85 removed. A quantity of acid 80, for example, is placed in the chamber 50 so that the upper surface 81 of the acid is below the upper portion of the chamber. It is to be understood that the plug 67 is in closing relation in the outlet port 52. The piston is then replaced in the chamber with the ball detent 103 engaged in the annular locking groove 90 and thus held in its upper retracted position above the upper surface of the acid. The cap 34 is then screw-threadably fitted on the outer wall 27 of the housing 21.

By suitable equipment, not shown, the cable 75 is grasped and the tool 20 lowered into the well casing 12. The packers 110 engage the casing in fluid-tight manner but not sufficiently tightly to prevent sliding of the tool downwardly under its own weight. The tool is elevationally positioned so that the packers are located above and below a portion, as 125, of the well casing to be cut. In this position, lowering of the tool is stopped so that the tool is suspended at the desired position by the cable 75. It is to be observed that during the lowering of the tool, however, any fluid, as 15, in the casing 12 is permitted to pass upwardly through the tubular member 39 so that the tool descends easily. It is also to be noted that fluid may be captured between the packers 110 as by entrance through cracks, not shown, in the casing as the tool descends. Although the packers are intended to be in fluid-tight engagement with the well casing when stationary, it is possible that small amounts of fluid may enter between the packers as they slide along the casing. Also, and as above mentioned, the packers may be of the inflatable type in which event fluid would be captured therebetween upon expansion in a well containing fluid.

In any event, after the packers 110 are set above and below the portion 125 to be cut, the cable 75 is given a slight jerk or pull at the surface of the hole 10. This releases the piston 85 from the detent ball 103. The piston then freely slides downwardly under its own weight in the chamber 50, the lower surface 88 engaging the upper surface 81 of the acid 80. The weight of the piston thus applies pressure against the acid confined in the chamber so that the acid pressure between the piston and the plug 67 rises sufficiently to force the plug out of the outlet port 52, as seen in Fig. 2. This permits the acid to be expressed or discharged from the chamber 50 out of the outlet port 52 and into the space 118 between the well casing 12 and the housing 21. The entrance of the acid into the space forces any air, gas and/or well fluid in the space through the inlet passageway 56 and up such passageway through its upper end 57 into the upper portion of the chamber above the descending piston. This exchange of fluid insures the descent of the piston and protects against the development of pressures below the piston greater than the weight thereof. Also, this enables the space 118 to be substantially filled with the chemical fluid employed and avoids excessive dilution.

The existence of the acid 80 in the space 118 brings it into contact with the portion 125 of the well casing 12. The acid quickly reacts with the material of the casing, as seen in Fig. 2, to disintegrate this material. The gas formed by this reaction is released through the gas release bore 60, the flapper valve 65 opening under the pressure of the escaping gas. The linings 51, 53, 68, 89, and 119 are provided to protect the adjacent parts of the housing from the acid. Obviously, the lining must be a material which resists or does not react with the chemical being employed. With most acids, glass is suitable, except for hydrofluoric acid with which a lining such as lead, platinum, or wax is preferred.

It will be evident that the acid 80 rapidly eats away the material, and after the tool 20 is raised to the surface 11 of the borehole 10, suitable equipment, not shown, may be employed for removing the upper section 13 of the well casing 12 from the hole. If the lower section 14 is damaged beyond repair, the upper section is thus salvaged. On the other hand it may be desired merely to repair the upper section and thereafter to replace it in the hole.

From the foregoing it will be evident that a highly effective tool has been provided especially adapted for cutting well casing by releasing a liquid dissolving agent therein. The tool is useful not only in salvaging and/or repairing well casings for use in boreholes but has a much wider application for releasing chemical materials in objects having holes into which it can be inserted. The tool is simple to construct and operate, economical, rapid in action, and dependable in accomplishing its intended functions.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described by invention, what I claim as new and desire to secure by Letters Patent is:

1. In a submersible borehole treating apparatus for treating the internal wall of a borehole while submerged in liquids contained therein, the combination of an elongated housing having an elongated bore extended therethrough and an internal fluid-tight chamber having upper and lower ends, means for lowering the housing into such a borehole whereby liquid in the borehole passes upwardly through the bore to permit such lowering, barrier means encircling the housing in longitudinally spaced relation thereon for fluid-tight engagement with the interior wall of a borehole into which the housing is lowered, the housing having inlet and outlet ports, individually extended from the upper and lower ends, respectively, of the chamber to ends opening exteriorly of the housing between the barrier means, said ends of the inlet and outlet ports being spaced circumferentially of the housing, means releasably sealing the outlet part in the housing, a borehole treating liquid in the chamber having an upper surface, a piston mounted for longitudinal slidable movement in the chamber above the liquid from an upper retracted position to a lower position applying pressure to the liquid for forcing it outwardly of the housing through the outlet port, and means releasably retaining the piston in said retracted position controllable to release the piston for movement into said lower position to express the liquid in the chamber through the outlet port out of the housing between the barrier means whereby well liquid between the barrier means is induced to pass through the inlet port into the chamber above the piston.

2. A submersible well casing tool comprising an elongated housing having a substantially cylindrical outer wall, upper and lower ends, an axially extended hollow tubular member open at the upper and lower ends of the housing, an annular liquid-tight chamber between the outer wall and the tubular member having upper and lower end portions, a liquid outlet port extended from the lower end portion of the chamber through the outer wall to the exterior of the housing, an elongated liquid inlet passageway extended longitudinally through the outer wall providing an upper end opening into the upper portion of the chamber and a lower end opening to the exterior of the housing at a position substantially diametrically opposite to the position where the outlet port opens out of the housing but above said outlet port, and an elongated gas release bore extended longitudinally in the outer wall having an upper end opening out of the housing at the upper end thereof and a lower end opening out of the housing at a position adjacent to the lower end of the inlet passageway; a plug closing the outlet port and being releasable therefrom upon development of a predetermined pressure in the chamber; an elongated cable connected to the housing for elevationally positioning the housing in a liquid containing well casing of metallic material; a quantity of acid in the chamber adapted to disintegrate the metallic material of such a well casing upon contact therewith and having an upper surface spaced from the upper extremity of the chamber; an annular piston circumscribing the tubular member having a lower face, an annular groove, and being freely slidably mounted in the chamber for slidable movement from an upper retracted position to a lower position engaging the upper surface of the acid to apply pressure thereto; a spring-pressed detent mounted in the outer wall of the housing engaging the annular groove of the piston for releasably retaining the piston in said retracted position; a pair of annular packers mounted in circumscribing relation on the housing and in longitudinally spaced relation therealong above and below the outlet port and the lower ends of the inlet passageway and gas release bore, and being engageable with a well casing in which the housing is positioned to define an annular liquid-tight space between the housing and such casing; acid-resistant linings in the chamber, on the lower face of the piston, in the outlet port, and in circumscribing relation on the housing between the packers, the piston being releasable from the detent incident to application of an upward jerk on the cable whereby the piston moves to its lower position to develop said predetermined pressure in the chamber, to release the plug, and to express the acid through the outlet port into said space between the packers, the well fluid in said space being forced through the inlet passageway into the upper end of the chamber so that the acid is brought into contact with the well casing, and the gas resulting from the reaction of the acid on the metal of the casing being released through said gas release bore.

3. A submersible well casing tool comprising an elongated housing having an outer wall, upper and lower ends, an axially extended hollow tubular member open at the upper and lower ends of the housing, an annular liquid-tight chamber between the outer wall and the tubular member having upper and lower end portions, a liquid outlet port extended from the lower end portion of the chamber through the outer wall to the exterior of the housing, and an elongated liquid inlet passage extended longitudinally through the outer wall providing an upper end opening into the upper portion of the chamber and a lower end opening to the exterior of the housing at a position substantially diametrically opposite to the position where the outlet port opens out of the housing but above said oulet port; a plug closing the outlet port and being releasable therefrom upon development of a predetermined pressure in the chamber; an elongated cable connected to the housing for elevationally positioning the housing in a liquid containing well casing of chemically dissolvable materal; a quantity of a liquid chemical dissolving agent in the chamber adapted to dissolve the material of such a well casing upon contact therewith and having an upper surface spaced from the upper extremity of the chamber; an annular piston circumscribing the tubular member having a lower face, an annular groove, and being freely slidably mounted in the chamber for slidable movement from an upper retracted position to a lower position engaging the upper surface of the acid to apply pressure thereto; a spring-pressed detent mounted in the outer wall of the housing engaging the annular groove of the piston for releasably retaining the piston in said retracted position; a pair of annular packers mounted in circumscribing relation on the housing and in longitudinally spaced relation therealong above and below the outlet port and the lower ends of the inlet passage, and being engageable with a well casing in which the housing is positioned to define an annular liquid-tight space between the housing and such casing; chemical-resistant linings in the chamber, on the lower face of the piston, in the outlet port, and in circumscribing relation on the housing between the packers, the piston being releasable from the detent incident to application of an upward jerk on the cable whereby the piston moves to its lower position to develop said predetermined pressure in the chamber to release the plug, and to express the chemical dissolving agent through the outlet port into said space between the packers, and to force the well fluid in said space through the inlet passage into the upper end of the chamber so that the dissolving agent is brought into contact with the well casing.

4. An apparatus for releasing a fluid chemical internally of a hollow object having a circumscribing wall within which the apparatus is received, which wall has a section substantially impervious to the passage of fluid, comprising a housing having a reservoir providing opposite end portions and adapted to contain an object-treating fluid chemical, the housing having an outlet passage providing an inner end in fluid communication with one end portion of the reservoir and an outer end opening at the exterior of the housing for releasing such a chemical from the reservoir; means connected to the housing for positioning the housing in such a hollow object; means closing the outlet passage and being releasable to open the outlet passage upon the exertion of pressure thereagainst from internally of the housing; packers mounted in circumscribing relation on the housing and spaced longitudinally of the housing with the outer end of the outlet passage therebetween, the packers having peripheries engageable with the substantially impervious section of the wall of the object into which the housing is positioned to form transverse fluid barriers between the housing and said interior wall of the object, said packers being adapted to confine chemical released from the outlet passage therebetween for contact with said impervious section of the interior wall; and means in the reservoir of the housing for exerting a pressure against the chemical to overcome the resistance of the outlet passage closing means and to force the chemical out of the outlet passage, the housing having an inlet passage providing an inner end in fluid communication with the reservoir at the opposite end portion thereof from the inner end of the outlet passage, the inlet passage also having an outer end opening exteriorly of the housing between the packers and in peripherally spaced relation to the outer end of the outlet passage for admitting fluid from the space between the packers into the reservoir when chemical is forced from the housing.

5. A well casing tool comprising an elongated fluid-tight housing adapted to be lowered in a well casing and providing an internal chamber having upper and lower portions, a pair of fluid barrier members circumscribing the housing in longitudinally spaced relation thereon adapted to form an annular fluid-tight space between the housing and the well casing, the housing having a fluid outlet port communicating with the lower portion of the chamber and extended from the chamber to the exterior of the housing between the barrier members, means releasably closing the outlet port, a quantity of well casing-treating fluid in the chamber having an upper level, a piston mounted in the chamber above the outlet port and the upper level of the treating fluid for longitudinal slidable movement from an upper retracted position in the upper portion of the chamber to a lower position in the lower portion of the chamber in engagement with the fluid for applying pressure thereto, and means releasably retaining the piston in said retracted position and being controllable to release the piston for movement toward said lower position to express the fluid through the outlet port into said space between the packing members for contact of the fluid with the well casing, the housing also having an inlet passageway communicating with the upper portion of the chamber above the piston and opening exteriorly of the housing between the barrier members and in spaced relation to the outlet port where the outlet port opens exteriorly of the housing.

6. In an apparatus for releasing a liquid internally of a borehole containing fluid and having a circumscribing interior wall, an elongated housing having an exterior surface, and providing an internal reservoir having upper and lower end portions, means connected to the housing for lowering the housing into a bore hole, upper and lower barrier means mounted in circumscribing relation on the exterior surface of the housing in spaced relation longitudinally of the housing engageable in substantially fluid-tight relation with the interior wall of the borehole in which the housing is lowered to form an annular chamber around the housing, the housing having an outlet passage providing an inner end opening into the reservoir and an outer end opening through the exterior surface of the housing between the barrier means, the housing also having an inlet passage providing an outer end opening through the exterior surface of the housing between the barrier means and an inner end opening into the reservoir, said inner ends of the inlet and outlet passages being respectively at the upper and lower end portions of the reservoir and said outer ends of the passages being in peripherally spaced relation to each other on the exterior surface of the housing, means releasably plugging the outlet passage, a fluid in the reservoir, and fluid pumping means in communication with the fluid in the reservoir for forcing the fluid from the reservoir through the outlet passage, displacing the means plugging the same, and into the chamber formed by the barrier means whereby pressure of the fluid entering said chamber causes borehole fluid in said chamber to pass through the inlet passage into the reservoir.

7. A submersible well casing tool for treating the internal wall of a liquid containing well casing into which the tool is inserted comprising an elongated housing having an axially extended bore providing open upper and lower ends, means for elevationally positioning the housing in such a well casing, the well liquid passing through the bore to facilitate such elevational positioning, upper and lower barrier means circumscribing the housing and adapted for substantially fluid-tight engagement with the interior wall of a well casing into which the tool is inserted to form an annular space between the housing and the well casing, the housing having a reservoir providing upper and lower end portions, said housing having a fluid inlet passage therein providing fluid communication between the upper end portion of the reservoir and the exterior of the housing between the barrier means, said housing also having an outlet passage therein providing fluid communication between the lower end portion of the reservoir and the exterior of the housing between the barrier means, the inlet and outlet passages being in peripherally spaced relation to each other where they open exteriorly of the housing between the barrier means, means releasably closing the outlet passage, a well casing treating fluid in the reservoir, and means in the housing operable to force fluid from the reservoir into the space defined by the barrier means through the outlet passage to displace the closing means and for causing the liquid in said space to pass into the reservoir through said inlet passage so that the well casing treating fluid is brought into contact with the interior wall of the well casing between the barrier means.

8. The apparatus of claim 4 wherein the treating fluid chemical is adapted to dissolve the portion of the wall of the hollow object which is contacted by the chemical; and wherein the reservoir, the outlet passage, and the housing between the packers are lined with a non-dissolving material resistant to said fluid chemical.

9. A submersible borehole treating apparatus for use in treating the walls of boreholes containing liquids comprising an elongated housing having a periphery and providing an internal reservoir having opposite end portions, means connected to the housing for positioning the housing in a borehole, barrier means on the periphery of the housing engageable with the wall of the borehole to define a chamber between the housing and said wall, piston means mounted in the reservoir for slidable movement longitudinally thereof having a retracted position and being urged toward a predetermined end portion of the reservoir, the housing providing conduits communicating with opposite end portions of the reservoir and opening into the chamber through the periphery of the housng in spaced relation to each other, a borehole treating liquid in the reservoir substantially filling the end portion thereof toward which the piston means is urged, means releasably closing the conduit communication with the end portion of the reservoir toward which the piston means is urged, and means releasably retaining the piston in retracted position controllable to release the piston for movement longitudinally of the reservoir to express liquid from the reservoir through one conduit into the chamber and to induce liquid confined by the barrier means in the chamber between the housing and the wall of the borehole to pass through the other conduit back into the chamber.

References Cited in the file of this patent

UNITED STATES PATENTS

| | | |
|---|---|---|
| 2,144,208 | Van Meter | Jan. 17, 1939 |
| 2,261,292 | Salnikov | Nov. 4, 1941 |
| 2,654,433 | Piety | Oct. 6, 1953 |
| 2,690,934 | Holcombe | Oct. 5, 1954 |
| 2,715,943 | True | Aug. 23, 1955 |
| 2,740,478 | Greene | Apr. 3, 1956 |
| 2,767,150 | Edds | Sept. 11, 1956 |
| 2,812,025 | Teague | Nov. 5, 1957 |
| 2,852,081 | Lebourg | Sept. 16, 1958 |